April 7, 1964 B. D. LUMMIS 3,128,348

LOUDSPEAKING INTERCOM SYSTEM

Filed Oct. 19, 1959 5 Sheets-Sheet 1

INVENTOR.
BRUCE D. LUMMIS

BY W. J. Shanley Jr.

ATTORNEY

LOUDSPEAKING INTERCOM SYSTEM

Filed Oct. 19, 1959 5 Sheets-Sheet 2

April 7, 1964 B. D. LUMMIS 3,128,348

LOUDSPEAKING INTERCOM SYSTEM

Filed Oct. 19, 1959 5 Sheets-Sheet 3

3,128,348

LOUDSPEAKING INTERCOM SYSTEM

Bruce D. Lummis, Webster, N.Y., assignor to General Dynamics Corporation, Rochester, N.Y., a corporation of Delaware Filed Oct. 19, 1959, Ser. No. 847,365
10 Claims. (Cl. 179—38)

The present invention relates to communication systems and more particularly to intercommunication systems of the loudspeaking type.

In intercom systems of the prior art having a plurality of remote substations, which are not provided with amplifiers but which are capable of initiating or receiving calls from master stations of the system, the output of each master station amplifier is normally connected to its speaker and the input of each such amplifier is normally connected in common to the remote stations. Thus, the master stations are ready to receive calls from the remote stations. However, any noise or interference present in output of the amplifier would also be reproduced by the master station speaker. Such noise is highly undesirable and, yet, it is difficult to eliminate in a system containing remotes that do not have amplifiers, when it is desirable for the master station to be available, in its normal idle position, for receipt of calls initiated by these remote stations. It is, thus, necessary in such systems for the remote station call-in circuit to be directly connected to the input of the master station amplifiers and, yet, it is highly desirable to eliminate objectionable noise issuing from the master station speaker when the system is idle, without interfering with the availability of the master station amplifier. Furthermore, it is essential that the method of eliminating the objectionable noise does not interfere with receipt of calls when a remote station calls in to the master station or when a selector switch of the master station is operated for communication with a selected station.

Since privacy is almost invariably required in loudspeaking intercom systems to prevent the master stations from surreptitiously listening in upon the operators of the remote substations, it is also desirable to provide a muting system for the master station amplifier which is under the control of the remote station operator and yet does not prevent the master station from calling the remote substation even when it is "in privacy."

It is further desirable in multimaster station intercom systems to prevent the cascading of the amplifiers of the master stations when two or more master stations simultaneously index the same remote station or when they index each other. Such cascading of amplifiers may result in acoustic feedback and render the entire system completely inoperative for communication purposes.

Various systems have been devised in the prior art to perform one or more of the above-noted functions, but these systems are quite complex and costly since they require separate muting devices and circuits to perform all of the above-noted functions.

It is, thus, desirable to provide a single muting device, the control circuits of which are very simple and yet perform all of the following functions:

(1) Mutes each master station amplifier when no selector switches have been operated and the master station communication direction control switch is in "listen" position.

(2) Automatically removes the mute from the master station amplifiers in "listen" position when a remote substation "calls in."

(3) Automatically removes the mute from each master station amplifier when a selector switch is operated prior to the initiation of a call to another station in the system.

(4) Automatically mutes each master station amplifier in "listen" position when it indexes a substation desiring privacy.

(5) Automatically mutes the master station amplifier in "listen" position when it indexes a remote station which is connected to another master station in the system which is in "talk" position, thereby preventing the cascading of the two master station amplifiers.

(6) Automatically mutes master station amplifiers in "listen" position when two master stations each have operated the selector switch corresponding with the other master station, thus preventing the cascading of amplifiers due to the connection of the output of one amplifier to the input of the other and vice versa. Furthermore, it continues to mute the amplifier of the master which has its communication direction control switch in "listen" position, when the other master station indexes its communication direction control switch to the "talk" position, in which case the output of the amplifier of the talking master would be directly connected across the loudspeaker of the listening master. The muting of the amplifier of the listening master is necessary since the output of its amplifier is also connected across the listening master's speaker. If this amplifier of the listening master station were not muted, the pickup and hum applied to the input of this amplifier would be applied to its own loudspeaker, thus rendering unintelligible the signal from the "talking" master station.

It is thus an object of my invention to provide a new and improved loudspeaking intercom system.

It is a further object of my invention to provide a new and improved loudspeaking intercom system wherein privacy of the user is assured.

It is still a further object of my invention to provide a new and improved loudspeaking intercom system in which the master station amplifiers are muted when no station selector switches have been operated and yet the mute on the amplifier is automatically removed whenever a remote substation calls in to the master station, or whenever a selector switch of the master station is operated.

It is a further object of my invention to provide a new and improved loudspeaking intercom system in which the user of the remote station can maintain privacy by operating a switch at the remote station and yet can still receive calls from the master stations of the system when the privacy switch is in its operated position.

It is still a further object of my invention to provide a muting control circuit for a loudspeaking intercom system having more than two master stations to prevent the cascading of the master station amplifiers if the master stations simultaneously select the same substation for communication therewith.

Another object of my invention is to provide a master station amplifier muting system for a loudspeaking intercom which mutes the master station amplifiers when the system is idle, allows the user of the remote substation to control the muting of the master station amplifier to obtain privacy and automatically prevents the cascading of amplifiers of the master stations when two master stations become interconnected due to the operation of selector switches.

These and other objects of my invention will become apparent from the ensuing description, in the course of which reference is had to the accompanying drawings, in which.

Figure 2:
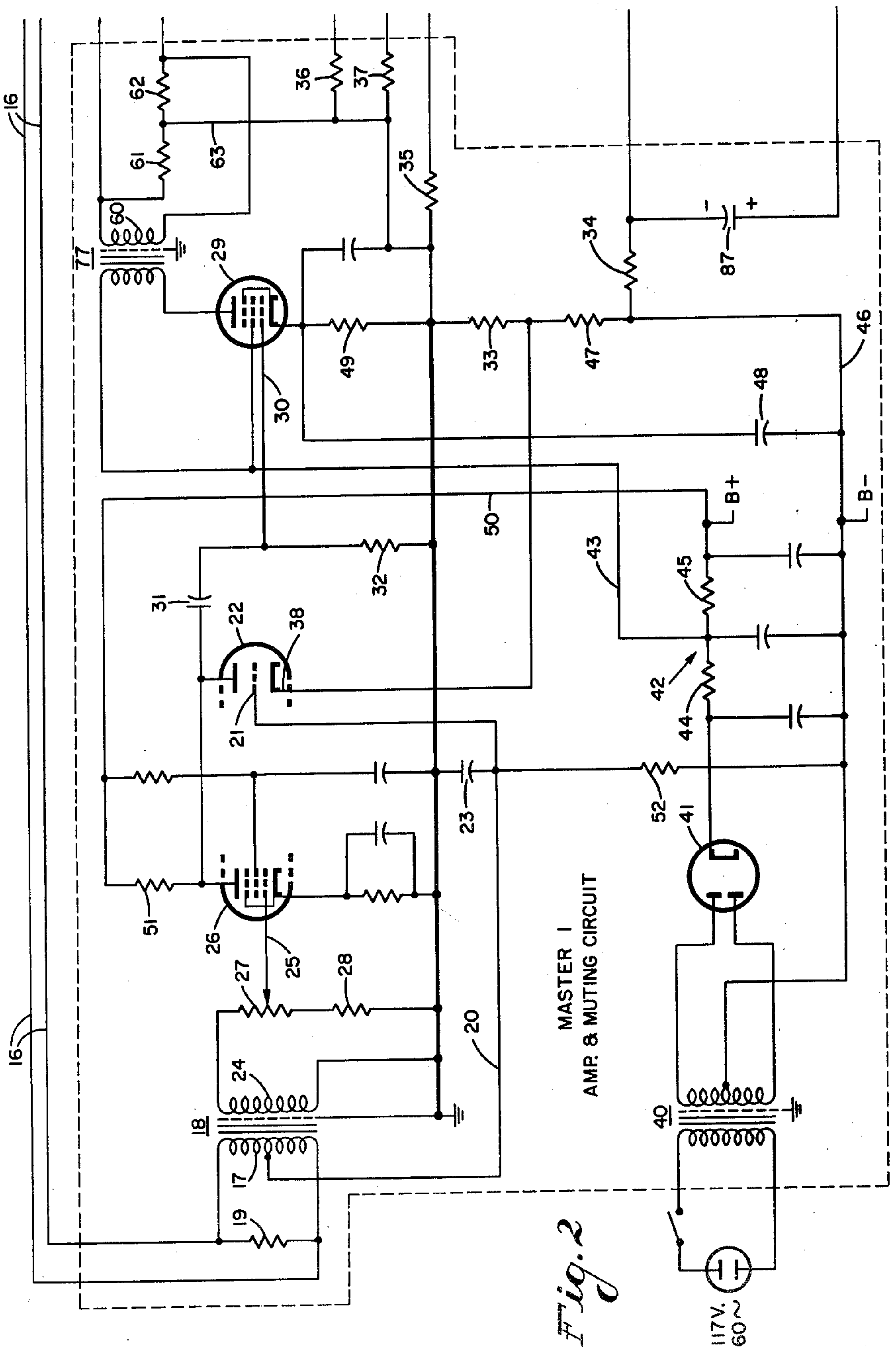
FIG. 2 is a circuit diagram of a portion of a master station used in the system of the present invention, which portion includes primarily the power supply and the amplifier of a master station.
Figures 3, 4:
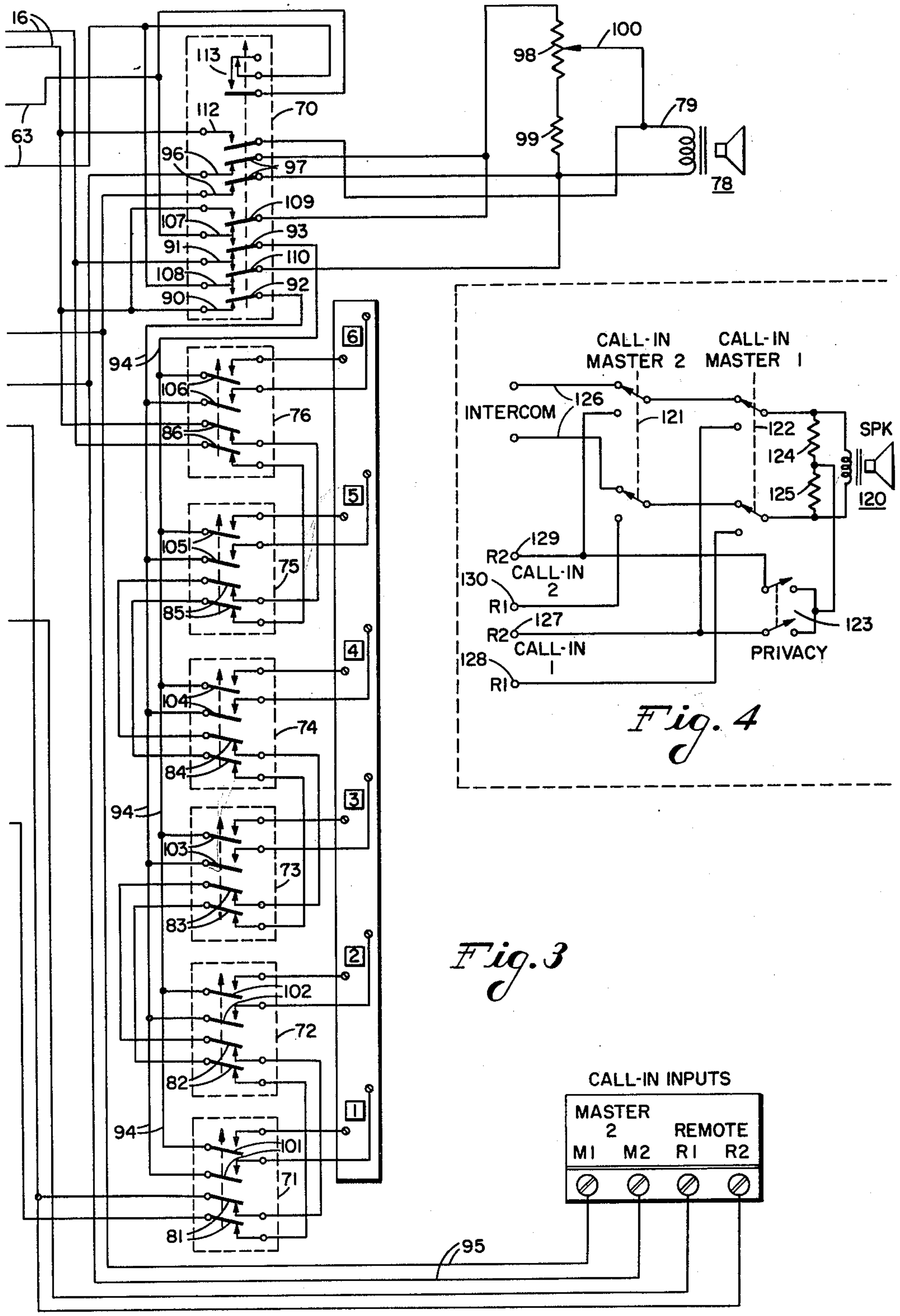

FIG. 3 is a circuit diagram of another portion of a master station, which portion includes the selector switches, communication direction control switch, the master station loudspeaker and the terminals for connecting the master station to the interstation circuits. FIGS. 2 and 3, when placed along side each other in matching relation represent an entire master station of the intercommunication system of my invention.

FIG. 4 is a wiring diagram of a substation of the intercommunication system of my invention.

FIGS. 5–8 illustrate different operating conditions of the intercommunication system of my invention.

The various master stations of my intercommunication system may be of identical construction and wiring and FIGS. 2 and 3 illustrate schematically any one of the master stations of this system. The various remote stations of my intercommunication system may also be of identical construction and wiring and FIG. 4 illustrates schematically any one of these stations. Corresponding elements in the master as well as corresponding elements in the remote stations will be identified with like reference numerals.

Figure 1:
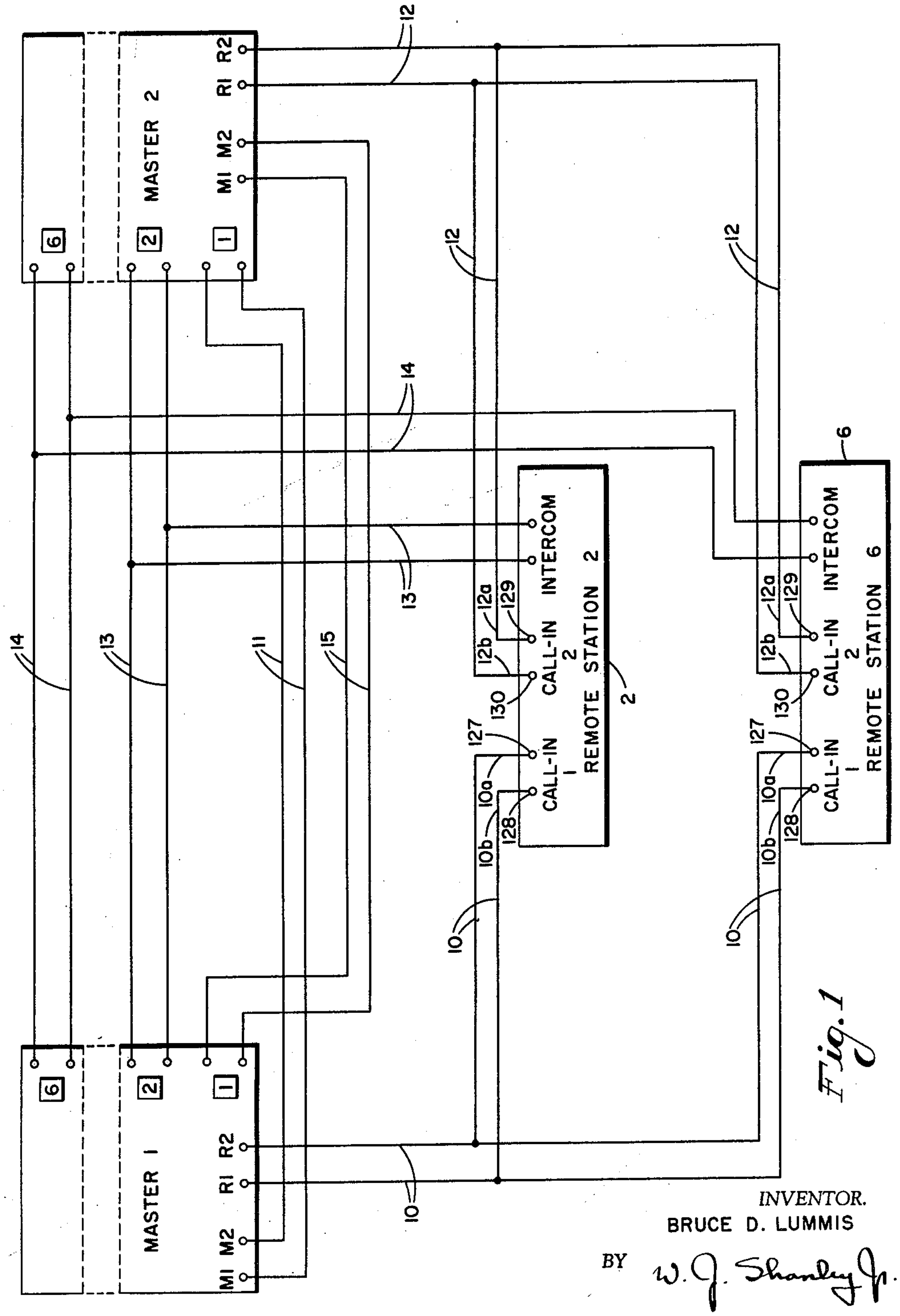
FIG. 1 illustrates the manner of interconnecting two master stations and two remote substations in the intercommunication system of my invention.

For the purpose of simplicity, I will describe the operation of my intercommunication system with relation to the two master stations and the two remote stations which are illustrated in FIG. 1. It will be recognized, however, that this system is capable of being expanded to include many master and many remote stations.

Referring now to FIG. 1, Master 1 and Master 2 each have two call-in input circuits, one for receiving calls from other master stations in the system and the other for receiving calls from any of the remote stations in the system. The call-in input circuits for receiving calls from other masters are connected to terminals M1 and M2, while the call-in input circuits for receiving calls from remote stations are connected to terminals R1 and R2. Remote Station 2 and Remote Station 6 are each provided with "Call-in 1" and "Call-in 2" terminals which are respectively connected in common to terminals R1 and R2 of Master 1 and Master 2 by interstation circuits 10 and 12.

The "Intercom" terminals of Remote Station 2 and Remote Station 6 are respectively connected, in common, to Master 1 and Master 2 by interstation circuits 13 and 14. Circuits 13 and 14 are, in turn, respectively connected in common to input terminals 2 and 6 of the master stations.

The master stations are interconnected for communication over interstation circuits 11 and 15. Circuit 11 interconnects master call-in terminals M1 and M2 of Master 1 and terminal 1 of Master 2, while interstation circuit 15 interconnects master call-in terminals M1 and M2 of Master 2 with terminal 1 of Master 1. Circuit 11 provides one-way communication from Master 2 to Master 1, while circuit 15 provides one-way communication from Master 1 to Master 2.

Interstation circuits 10 and 12 also, respectively, provide a circuit for one-way communication between the remote stations and Master 1 and Master 2. Interstation circuits 13 and 14 which are respectively individual to Remote Station 2 and Remote Station 6 provide a connection for intercommunication between the masters and the corresponding remote station, as will be more apparent as this description proceeds.

Referring now to FIG. 2, which discloses the details of Master 1, amplifier input circuit 16 is connected across primary winding 17 of amplifier input transformer 18. Resistance 19 is connected in parallel with primary winding 17, the center tap of which is connected over conductor 20 to control electrode 21 of a suitable electron discharge device 22, shown as a triode. Grid 21 is returned to ground through capacitor 23 and connected to B— through resistor 52. Secondary winding 24 of transformer 18 is coupled to grid 25 of pentode 26 through the movable arm of potentiometer 27 which is connected in series with resistor 28 across winding 24.

The first stage of amplification which includes pentode 26 is a conventional pentode amplifier which is RC-coupled to the grid 30 of pentode 29 through capacitor 31 and resistor 32. Pentode 29 is coupled to the output circuit through output transformer 77, the primary winding of which is connected in the plate circuit of pentode 29. Since both stages of amplification of this amplifier are entirely conventional, no further description is felt to be necessary except as to the function of triode 22 which is connected in shunt with the output circuit of pentode 26.

The plate of triode 22 is directly connected to the plate of pentode 26, while the cathode is connected through resistance 33 to ground. Thus the series combination of triode 22 and resistor 33 is connected in shunt with the signal path between pentode 26 and pentode 29. Thus, by controlling the state of conduction of triode 22, the amplifier may be rendered operative or muted in accordance with the state of conduction of triode 22. The manner of controlling the state of conduction of triode 22 through its control grid 21, which is a part of the muting control circuit, will be hereinafter described with relation to FIGS. 5–8. It suffices here to say that when triode 22 is conducting, it operates as a short across the output circuit of pentode 26 and consequently mutes the amplifier. However, when triode 21 is cut-off, it has no effect upon the operation of the amplifier.

The power supply for Master 1 includes power transformer 40, diode 41 and filter 42. In order to supply the plate and screen grid operating potentials for pentode 29 I provide conductor 43 which is connected to the junction of resistors 44 and 45 of filter 42. The output of the power supply appears across the output of filter 42 at terminals B+ and B—. The B— terminal is connected to ground through conductor 46, resistor 47 and resistor 33, in series. In order to bypass signal currents around resistors 33, 47 and 49, I provide capacitor 48 which is connected between the cathode of pentode 29 and B—. B+ is provided over conductor 50 to pentode 26 and triode 22 through plate-dropping resistor 51.

Secondary winding 60 of output transformer 77 is connected in parallel with series-connected resistors 61 and 62. Resistors 61 and 62 are of equal value and the grounding of the connection comon to the two resistors over conductors 63 provides an output circuit balanced with respect to ground.

Referring now to FIG. 3, there is illustrated communication direction control switch 70 and station selector switches 71–76 which control the interconnection of the amplifier input and output circuits, with Master 1 and monitor speaker 78 as well as the other master and remote stations of the system. Communication direction control switch 70 which is illustrated and its normal "listen" position, is operable to a displaced or off-normal "talk" position and upon release returns to its normal "listen" position. Selector switches 71–76 which are illustrated in their normal unoperated position, are operable to their operated positions and remain in such position until they are manually returned to their unoperated positions.

Amplifier input circuit 16 is connected to remote call-in input terminals R1 and R2 through series-connected sets of break contacts 81–86 of selector switches 71–76. D.C. blocking capacitor 87 is inserted in series with one conductor of this circuit between terminals R1 and one of break contacts of set 81. Terminal R1 is also connected to B— through resistor 34 while terminal R2 is connected to ground through resistor 35. Thus, primary 17 of input transformer 18 is connected across remote call-in input terminals R1 and R2 whenever the system is idle; that is, whenever selector switches 71–76 are all in their normal unoperated positions.

Amplifier input circuit 16 is also connected to stationary contacts 90 and 91 of switch 70. When switch 70 is in its indicated "listen" position, circuit 16 is connected through movable contacts 92 and 93 to common intercom bus 94 which is connected in common to make contacts 101–106 of selector switches 71–76. Thus, whenever any selector switch is operated, while the communication direction control switch 70 is in its "listen" position, a corresponding pair of terminals 1–6 are connected to intercom bus 94 and in turn input circuit 16 of the amplifier. Upon operation of one or more selector switches, the connection between remote call-in input terminals R1 and R2 and input circuit 16 is broken at the break contacts of the corresponding selector switch, thus preventing interference between the conversation carried on with the selected station and any attempted call-in from a remote station of the system.

Master call-in input terminals M1 and M2 are connected over call-in circuit 95 to stationary contacts 96 of switch 70. When switch 70 is in its indicated "listen" position, stationary contacts 96 are connected through movable contacts 97 across speaker monitor potentiometer 98 and resistor 99. Movable contact 100 is connected to one terminal of the voice coil 79 of speaker 78, while the other terminal of the voice coil is connected to the point in common with resistor 99 and the lower contact of movable contacts 97. Thus, when the communication direction control switch is in its indicated "listen" position, master call-in input terminals M1 and M2 are connected to speaker 78 through speaker volume control potentiometer 98.

Call-in circuit 95 is balanced with respect to ground due to the connection of terminals M1 and M2 to ground through resistors 36 and 37, respectively.

Amplifier output circuit 63 which is connected across secondary winding 60 of output transformer 77 is connected to stationary contacts 107 and 108 of switch 70. When switch 70 is in its indicated "listen" position, contacts 107 and 108 are connected across potentiometer 98 and resistance 99 through movable contacts 109 and 110, and consequently the output of the amplifier is connected through contacts of switch 70 across the speaker volume control network.

To recapitulate, when switch 70 is in its "listen" position and none of the selector switches has been operated, remote call-in input terminals R1 and R2 are connected to the amplifier input while the output of the amplifier is connected in common with master call-in input terminals M1 and M2 to speaker 78. Therefore, when a master station is in its idle condition, i.e., the communication direction control switch is in its "listen" position, and the selector switches are in their unoperated positions, the station is conditioned to receive calls from remote and master stations.

Upon operation of communication direction control switch 70 to its "talk" position, coil 79 of speaker 78 is directly connected across input circuit 16 through movable contacts 110 and 111 and stationary contacts 91 and 112. Therefore, when speaker 78 is connected to the input of the amplifier through circuit 16, it by-passes the volume control network which includes potentiometer 98 in order that the entire signal will be applied independently of the position of movable arm 100.

Amplifier output circuit 63 is connected to intercom bus 94 through stationary contacts 107 and 108 and movable contacts 92 and 93. Therefore, when switch 70 is in its "talk" position, the output of the amplifier is connected to intercom bus 94 which in turn is selectively connected to terminals 1–6 through make contacts 101–106 upon the operation of the corresponding selector switch to its operated condition.

Means are provided during the operation of switch 70 for applying a short across amplifier output circuit 63 to mute the amplifier during the switching operation. For this purpose contacts 113 are adjusted to be the first set of contacts to make and the last set to break in each direction of operation of switch 70. This prevents switching clicks from being reproduced by the speakers of the system.

Referring now to FIG. 4, each remote station includes an electro-acoustic transducer 120 which may be a suitable form of loudspeaker capable of operating both as a microphone and as a loudspeaker. The remote stations also include call-in switches 121 and 122, and privacy switch 123. The stationary contacts of switch 123 are connected in common to a connection common to resistors 124 and 125 which are connected in series across the coil of transducer 120. Switch 123, which is illustrated in its unoperated position, will remain in either its operated or unoperated position until it is manually moved to the other position. However, call-in switches 121 and 122, shown in their normal unoperated positions, will return to their normal positions from the off-normal operated positions upon being released. Thus, remote station intercom circuit 126 is directly connected to transducer 120 through the normal contacts of switches 121 and 122. The operation of call-in switch 122 to its off-normal position connects transducer 120 to Call-in 1 terminals 127 and 128. The operation of switch 121 to its off-normal position connects transducer 120 to Call-in 2 terminals 129 and 130. Call-in terminals 127 and 129 are also connected to respective movable contacts of switch 123 to thereby provide a connection to the point common to resistors 124 and 125. These resistors are of equal current value so as not to disturb the balance of the audio circuits when muting control flow in the audio circuits.

Referring now to FIG. 1, conductors 10*a* and 10*b* of circuit 10 are respectively connected between master terminal R2 and remote terminal 127 and master terminal R1 and remote terminal 128, while conductors 12*a* and 12*b* of circuit 12 are respectively connected between Master 2 terminal R2 and remote terminal 129 and Master 2 terminal R1 and remote terminal 130.

Figure 5:
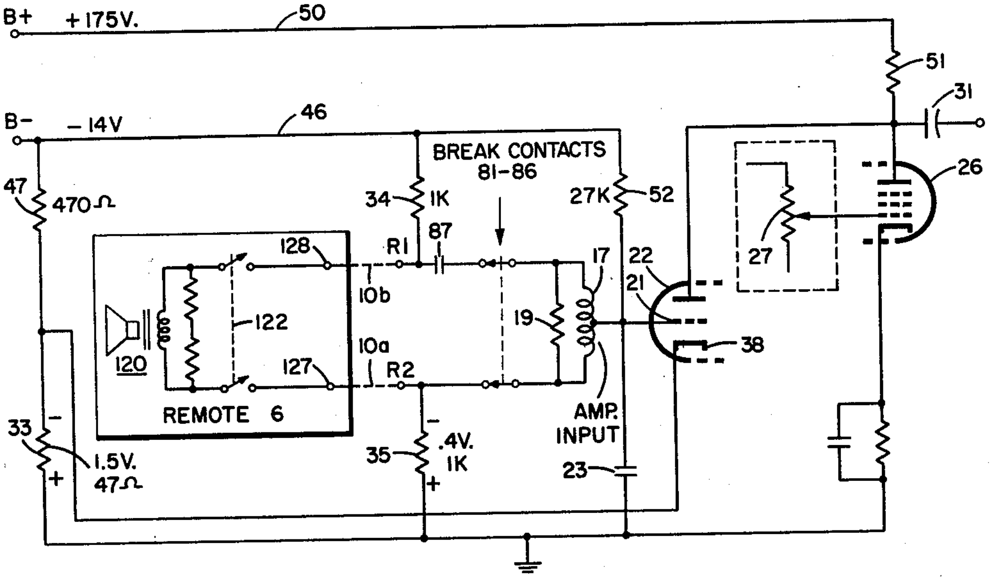

FIG. 5 illustrates the portions of Master 1, the interstation circuits and a remote station necessary to explain the operation of the muting circuit when Master 1 is in its idle condition and no remote stations have operated. Portions of the circuit illustrated in FIG. 2 have been rearranged and simplified in FIG. 5 in order to aid the explanation of the operation of the muting circuit. For example, break contacts 81–86 of the selector switches have been illustrated as one set of contacts for simplicity. To further aid in simplifying this circuit, the illustrated remote station does not illustrate call-in switch 121 and privacy switch 123 since they are not involved in the circuit being described. In addition, representative voltage values and resistance values are stated in order to facilitate an understanding of this circuit.

B+=175 volts
B−=−14 volts
33=47 ohms
34=1000 ohms
35=1000 ohms
47=470 ohms
52=27K Since resistors 33 and 47 carry the entire plate current of the amplifier, B− and conductor 46 are at −14 volts with respect to ground. The divider action of resistors 33 and 47 places cathode 38 of muting triode 22 at −1.5 volts. Grid 21 of triode 22 is connected to the divider network which includes resistors 35 and 52. Since the resistance of primary winding 17 is negligible, the voltage drop across the lower portion of this winding would be negligible and it will be ignored in this analysis. Since this latter divider network is also connected between B− and ground, grid 21 will be at approximately −.4 volt with respect to ground. No current flows in resistor 34 due to the blocking action of capacitor 87 and the open circuit at the contacts of switch 122. Thus the resultant grid bias on triode 22 due to the action of these two divider networks is +1.1 volts. This bias is sufficiently positive to allow triode 22 to conduct. Thus, triode 22 is conducting when master station Master 1 is in its idle condition and none of the remote stations has operated its call-in switch 122. As was hereinbefore explained, when triode 22 is conducting, it mutes the amplifier by providing a low impedance shunt around plate load resistor 51 of pentode 26.

If one of the remote stations desires to call master station Master 1, they operate call-in switch 122 which connects remote speaker 120 to call-in circuit 10. The completion of this call-in circuit establishes an alternate D.C. path in parallel with resistance 52 and the lower portion of winding 17. This path includes resistor 34, terminal R1, interstation conductor 10*b*, terminal 128, a contact of switch 122, the coil of transducer 120, the other contact of switch 122, terminal 127, interstation conductor 10*a*, and terminal R2 which is directly connected to one side of resistor 35. Assuming that the resistance of this path is primarily due to the resistance of resistance 34, we have effectively connected 1000 ohms in parallel with 27K. Thus when this circuit is established, the drop across resistor 35 will be approximately 7 volts. Since the negative end of resistance 35 is connected to the grid, the resultant grid bias will now be the difference between the —7 volts and +1.5 volts which is developed across resistance 33, i.e., —5.5 volts. This is sufficient to cut-off triode 22, thereby removing the mute from the amplifier.

Thus, when the call-in switch at a remote station is operated, the corresponding master station amplifier is rendered operative so that the signals applied to remote call-in input terminals R1 and R2 will be reproduced at the output of the amplifier and applied to master transducer 78. When this remote call-in circuit is broken upon the release of the master call-in switch, the master station amplifier will automatically be muted due to the conduction of triode 22.

Figure 6:
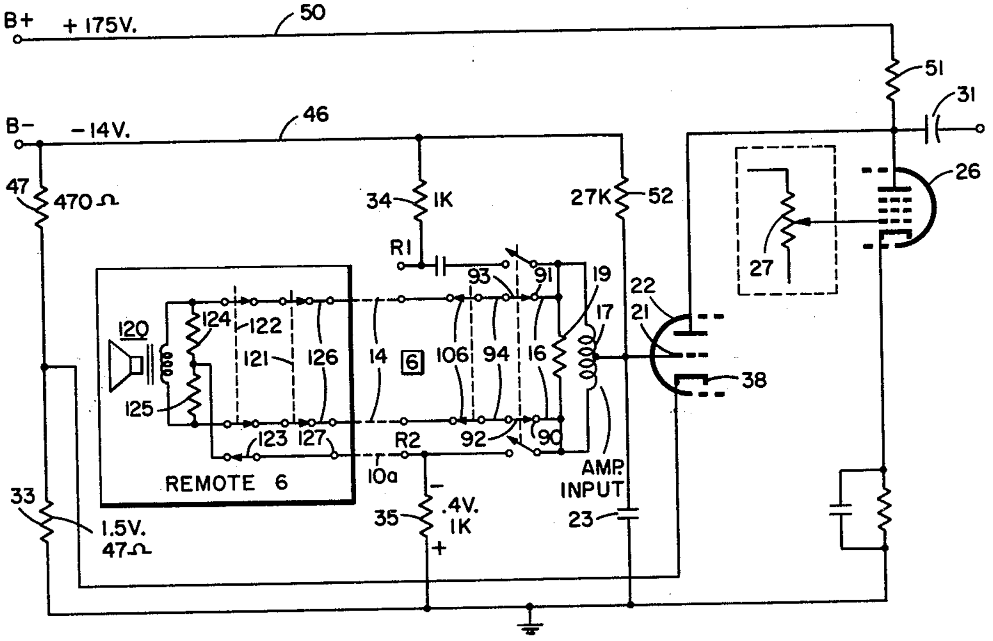

FIG. 6 illustrates the operation of the muting circuit for privacy purposes when a master station having switch 70 in its "listen" position selects remote station 6 which has its privacy switch in its operated condition. When a selector switch is operated, the connection between remote call-in input terminals R1 and R2 and the primary winding 17 of input transformer 18 is broken at the break contacts of the operated selector switch. Breaking call-in input circuit 16 to the master amplifier also breaks the connection between the negative end of resistance 35 and the lower end of primary winging 17. Thus, if no other path is established, grid 21 of the triode is connected to B— through resistance 52 and consequently the drop across resistance 47 would bias triode 22 to cut-off thereby removing the mute from the amplifier. However, if switch 123 of the selected station is in its operated position, the connection between resistance 52 and 35 will be established from the center tap of winding 17 through both halves of windings 17, amplified input circuit 16, make contacts 90, 92 and 91, 93, intercom bus circuit 94, make contacts 106 of selector switch 76, interstation circuit 14, remote intercom circuit 126, the normally closed contacts of switches 121 and 122, resistance 124 and 125 through the operated contacts of switch 123, terminal 127, interstation conductor 10*a* and terminal R2 which is connected to resistance 35. Since this circuit for interconnecting resistance 52 and 35 is of fairly low impedance, the drop across resistance 35 will be approximately .4 volt. As was hereinbefore pointed out with respect to FIG. 5, this places the grid of triode 22 at approximately +1.1 volts with respect to cathode 38. Thus the completion of this divider network through interstation circuits 14 and 10*a* provides automatic muting of the mast station amplifier. Since the break contacts of communication direction control switch 70 are in series with the divider network between the point connected to grid 21 and the negative end of resistance 35, the operation of switch 70 will open this circuit thereby removing the mute from the amplifier and allow the amplifier to talk with the remote station even though privacy switch 123 remains in its operated position. This circuit is established over master station amplifier output circuits 63 through make contacts of switch 70, intercom bus circuit 94, make contacts 106 of selector switch 76, interstation circuit 14 and intercom circuit 126, and thence through the normally closed contacts of switches 121 and 121 to speaker 120.

Thus, in accordance with my invention, the user of a remote station is assured of privacy; yet he can receive calls from the master stations without requiring any manipulation of switches at the remote station.

Figure 7:
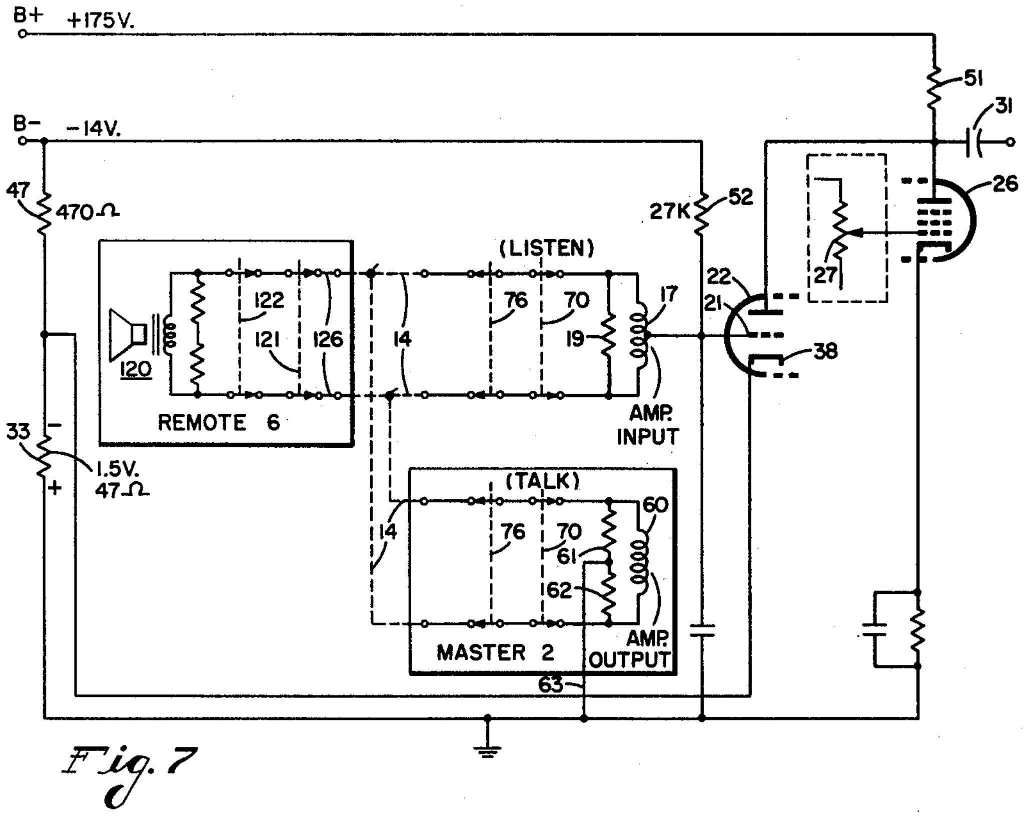

FIG. 7 illustrates the operation of the muting circuit of master station Master 1 to prevent the cascading of the amplifiers of master station Master 1 and master station Master 2 when they both have selected station 6 by the operation of selector switch 76. Master 1 is illustrated in its "listen" position while Master 2 is illustrated in its "talk" position. Input winding 17 of Master 1 is now connected across output windings 60 of Master 2. The ground applied through conductor 63 to this output circuit completes the divider control network which now includes resistor 52 of Master 1, interstation circuit 14 between primary winding 17 of Master 1 and secondary winding 60 of Master 2 and resistors 61 and 62 in parallel. The resistance of this circuit between grid 21 and ground will be assumed to be of the order of 1000 ohms and as a consequence thereof the drop between grid 21 and ground would be approximately the same as that which appears across resistor 35 in FIGS. 5 and 6. The establishment of this circuit thus mutes the amplifier of Master 1 in the same manner as hereinbefore noted with respect to FIGS. 5 and 6 and thereby prevents the cascading of the amplifiers of the master stations.

Figure 8:
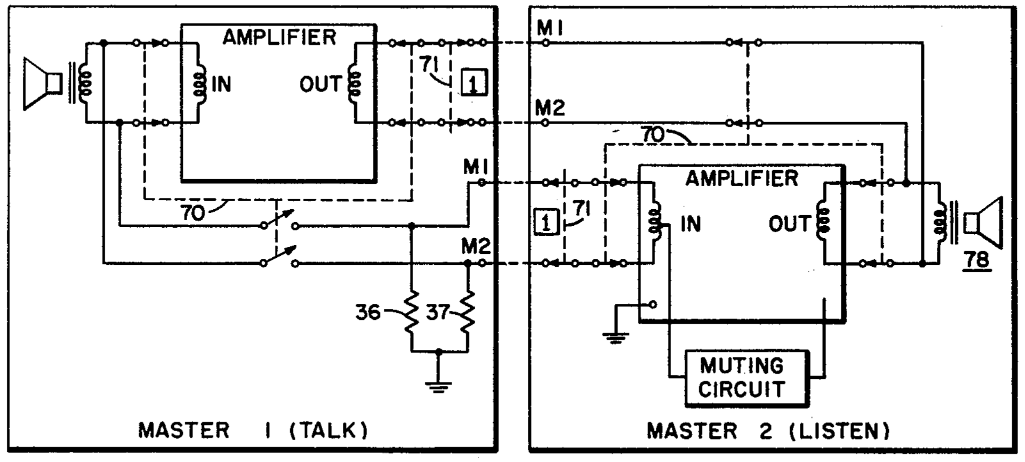

FIG. 8 illustrates the circuits for communicating between master stations and how the muting circuit prevents these amplifiers from being cascaded when they are both in their "listen" condition. The muting control circuit also mutes a master station amplifier in "listen" position when the other master station amplifier is in "talk" position. This prevents the application of noise and hum which would normally be present in the output of an unmuted amplifier in "listen" position to the speaker of the listening master and thus prevents interference with the message from the "talking" master, which is also applied across the same speaker.

If selector switch 71 of each master station is operated, the output of each amplifier will be applied to master call-in input terminals M1 and M2 of the other master and thus be connected through circuit 95 and break contacts 96—97 of "talk-listen" switch 70 to master station speaker 78. Since resistors 36 and 37 are connected between call-in input circuit 95 and ground, the ground applied to terminals M1 and M2 will be applied to the center tap of winding 17 to thereby mute the amplifier in "listen" position. Since this ground in the input circuit of the master station amplifier will be removed when its communication direction control switch 70 is operated to the "talk" position, the mute on its amplifier will be automatically removed, thereby enabling the operator to talk to the other master station. However, for the other master to receive the message, it must then be in "listen" position.

While I have shown and described a specific embodiment of my invention, various changes may be made in the form of the invention herein shown and described without departing from the spirit of the invention in the scope of the following claims.

What is claimed is:

1. In a loudspeaking intercommunication system having a master and a remote station, amplifying means having input and output circuits, an electroacoustic transducer located at each of said master and remote stations, means for connecting the transducer at said master station to said output circuit of said amplifying means, a call-in circuit extending from said remote station to said master station, means for connecting said call-in circuit to said input circuit of said amplifying means to thereby form a call-in signal path which extends from said remote station to said transducer at said master station, switch means located at said remote station for connecting said transducer located thereat to said call-in circuit when said switch assumes a first condition and for disconnecting said transducer from said call-in circuit when said switch means assumes a second condition, and means for muting said amplifying means when said switch means of said remote station has assumed said second condition.

2. In a loudspeaking intercommunication system having a master and a remote station, amplifying means having input and output circuits, an electroacoustic transducer located at each of said master and remote stations, means for connecting the transducer at said master station to said output circuit of said amplifying means, a call-in circuit extending from said remote station to said master station, means for connecting said call-in circuit to said input circuit of said amplifying means to thereby form a call-in signal path which extends from said remote station to said transducer at said master station, switch means located at said remote station for connecting said transducer located thereat to said call-in circuit when said switch assumes a first condition and for disconnecting said transducer from said call-in circuit when said switch means assumes a second condition, an impedance element capable of assuming a high and low level of impedance, means for connecting said impedance element in shunt with the signal path of said amplifying means, said low level of impedance being of such a value as to effectively mute said amplifying means, and means for causing said impedance element to assume said low level of impedance when said switch means assumes said second condition and said high level of impedance when said switch means assumes said first condition.

3. In a loudspeaking intercommunication system having a master and a remote station, master station amplifying means having input and output circuits, an electroacoustic transducer located at each of said master and remote stations, said transducer at said remote station being a bidirectional transducer, means for connecting said transducer at said master station to said output circuit, interstation circuits extending from said master station to said remote station, means for connecting said bidirectional transducer at said remote station to said interstation circuits, means for connecting said interstation circuits to said input circuit, privacy switch means located at said remote station having operative and inoperative conditions, means located at said master station for muting said amplifying means, and means including said input circuit connecting means for controlling said muting means in accordance with the operative condition of said switch means whereby privacy at said remote station is under the control of the operator at the remote station.

4. In a loudspeaking intercommunication system having a master and a remote station, master station amplifying means having input and output circuits, an electroacoustic transducer located at each of said master and remote stations, a communication direction control switching device located at said master station, said device having normal and off-normal positions and having a plurality of normally open contacts and a plurality of normally closed contacts, said electroacoustic transducer at said remote station being a bidirectional transducer, means including a pair of said normally closed contacts for connecting said transducer at said master station to said output circuit, interstation circuits extending from said master station to said remote station, means for connecting said bidirectional transducer at said remote station to said interstation circuit, means including another pair of said normally closed contacts for connecting said interstation circuit to said input circuit, privacy switch means located at said remote station having operative and inoperative conditions, means for muting said amplifying means, and means including said normally closed contacts of said input circuit connecting means for rendering said muting means operative in response to the operation of said privacy switch means to its operative condition, said rendering means being responsive to the operation of said direction control switching device to its off-normal condition and the opening of said normally closed contacts of said input circuit connecting means to render said muting means inoperative whereby said muting is rendered inoperative in spite of the position of said privacy switch means whenever said direction control switching device is placed in its off-normal condition.

5. In an intercommunication system, first and second master stations, first amplifying means having input and output circuits and being located at said first master station, second amplifying means having input and output circuits and being located at said second master station, a first electroacoustic transducer, means for connecting said first transducer to said input circuit of said first amplifying means, a second electroacoustic transducer located at a remote station, first interstation circuits extending from said first master to said remote station, second interstation circuits extending from said second master to said remote station, means for connecting said second transducer in common to both said interstation circuits, first switch means operable to a given position for connecting said input circuit of said second amplifying means to said second interstation circuit, second switch means operable to a given position for connecting said output circuit of said first amplifying means to said first interstation circuit, means for muting said second amplifying means, and means for rendering said muting means operative in response to the connection of said second amplifying means input circuit and said first amplifying means output circuit in common to said second transducer via said interstation circuits whereby cascading of amplifiers is prevented by automatically muting the second amplifying means when its input is connected across the output of the first amplifying means through the interstation circuits.

6. In an intercommunication system, first and second master stations, first amplifying means having input and output circuits and being located at said first master station, second amplifying means having input and output circuits and being located at said second master station, a first electroacoustic transducer, means for connecting said first transducer to said input circuit of said first amplifying means, a second electroacoustic transducer located at a remote station, first interstation circuits extending from said first master to said remote station, second interstation circuits extending from said second master to said remote station, means for connecting said second transducer in common to both said interstation circuits, means including a first switch operable to a given position for connecting said input circuit of said second amplifying means to said second interstation circuit, means including a second switch operable to a given position for connecting said output circuit of said first amplifying means to said first interstation circuit, means operable when in a first condition for shunting the signal path of said second amplifying means, said shunting means being ineffective when in a second condition and means responsive to said first and second switching means both assuming said given positions for placing said shunting means in said first condition whereby said second amplifying means is rendered ineffective by shunting its signal path whenever its input circuit is connected across said output circuit of said first amplifying means via the interstation circuits.

7. In a loudspeaking intercommunication system, first and second master stations, second master station amplifying means having input and output circuits, electroacoustic transducer located at said second master station, first and second interstation circuits extending between said first and second master stations, communication direction control switch means for said second master station having talk and listen positions, means including contacts of said second master station switch means for connecting said first interstation circuit and said output circuit of said second master station amplifying means in common to said second station transducer in response to said switch assuming said listen position, means including said switch means for connecting said second interstation circuit to said input circuit of said second station amplifying means when said second station switch assuming said listen position, means for muting said amplifying means of said second master station when said muting means is placed in its operated condition, and control means including said second interstation circuit for operating said muting means to said operated conditions in response to the connection of said second interstation circuit to said input circuit whereby the amplifying means of a master station whose communication direction control switch is in its listen position is automatically muted when it is connected to another master station.

8. In a multimaster station loudspeaking intercommunication system the combination of first and second master stations each including amplifying means having input and output circuits, electroacoustic transducing means, communication direction control switching means having first and second positions, call-in circuit means, communication circuit means, said direction control switching means being operative when placed in said first condition for connecting said call-in circuit and said output circuit to said transducing means and said communication circuit to said input circuit and being operative when placed in said second condition for connecting said input circuit to said transducer and said output circuit to said communication circuit, means operative for muting said amplifying means; interstation circuits for connecting said call-in circuit of said first master station to said communication circuit of said second master station and said call-in circuit of said second master station to said communication circuit of said first master station; means including said interstation circuits for placing said muting means of said second master station in said operative condition in response to the completion of the connection of said call-in circuit of said first master station to said input circuit of said second master station amplifying means, and means including said interstation circuits for placing said muting means of said first master station in said operative condition in response to the completion of the connection of said call-in circuit of said second master to said input circuit of said first master station amplifying means.

9. In a loudspeaking intercommunication system the combination of a master station including amplifying means having input and output circuits, electroacoustic transducing means, communication direction control switching means having first and second positions, a call-in circuit, a plurality of selector switches having operated and unoperated conditions, a communication circuit, said direction control switching means being operative when placed in said first condition for connecting said output circuit to said transducing means and said communication circuit to said input circuit and being operative when placed in said second condition for connecting said input circuit to said transducer and said output circuit to said communication circuit, means including series connected break contacts of each of said plurality of selector switches for connecting said call-in circuit to said input circuit, means connected to said amplifying means for muting said amplifying means in response to the application of a first control voltage to said muting means, said muting means being responsive to the application of a second control voltage for removing the mute on said amplifying means; a plurality of remote stations each including bidirectional electroacoustic transducing means, a communication circuit, a call-in circuit, call-in switch means having a normal and off-normal position, means for selectively connecting said transducing means to said communication circuit when said switch means is in normal position and to said call-in circuit when said switch means is in said off-normal position; first interstation circuits for connecting said call-in circuit of said master station in common to said call-in circuits of said plurality of remote stations; a plurality of individual interstation circuits each of which extends respectively from an individual selector switch of said plurality of selector switches to said communication circuit of the corresponding remote station of said plurality of remote stations; means responsive to the selective operation of said selector switch means to said operated condition for selectively connecting said individual interstation circuits to said communication circuit of said master station; a muting control circuit coupled to said input circuit and including a source of voltage, first voltage divider network, second voltage divider network, means for connecting said source across said first and second divider networks, means for connecting said divider network muting means between a point on said first and a point on said second divider network, said first divider network including said break contacts of each of said plurality of selector switches connected in series with elements of said first divider network between said point on said point and side of said source, said muting control circuit being responsive to the completion of said first divider network in response to the completion of said connection between said call-in circuit and said input circuit through said break contacts of said selector switches for developing said first control voltage between said points on said first and second divider networks whereby said amplifying means remain muted when said selector switches are in said unoperated conditions.

10. In a loudspeaking intercommunication system the combination of a master station including amplifying means having input and output circuits, electroacoustic transducing means, communication direction control switching means having first and second positions, a call-in circuit, a plurality of selector switches having operated and unoperated conditions, a master station communication circuit, said direction control switching means being operative when placed in said first condition for connecting said output circuit to said transducing means and said communication circuit to said input circuit and being operative when placed in said second condition for connecting said input circuit to said transducer and said output circuit to said communication circuit, means including break contacts of each of said plurality of selector switches for connecting said call-in circuit to said input circuit, means connected to said amplifying means for muting said amplifying means in response to the application of a first control voltage to said muting means; a plurality of remote stations each including bidirectional electroacoustic transducing means, a remote station communication circuit, a call-in circuit, first switch means having a normal and off-normal position, means for selectively connecting said transducing means to said remote station communication circuit when said switch means is in normal position and to said call-in circuit when said switch means is in said off-normal position; first interstation circuits for connecting said call-in circuit of said master station in common to said call-in circuits of said plurality of remote stations; a plurality of individual interstation circuits each of which extends respectively from an individual selector switch means of said plurality of selector switch means to said communication circuit of the corresponding remote station of said plurality of remote stations; means responsive to the selective operation of said selector switch means to said operated condition for selectively connecting said individual interstation circuits to said communication circuit of said master station; a muting control circuit connected to said input circuit and said master call-in circuit, said muting control circuit including a series connected circuit which is completed through break contacts of each of said plurality of selector switches, said control circuit being responsive to the completion of said series circuit for applying said first control voltage to said muting means to thereby mute said amplifying means when no selector switches have been operated.

References Cited in the file of this patent

UNITED STATES PATENTS

| | | |
|---|---|---|
| 2,269,143 | Campbell | Jan. 6, 1942 |
| 2,841,647 | Blow | July 1, 1958 |